United States Patent
Chandrasekaran (10) Patent No.: US 10,574,129 B2
(45) Date of Patent: Feb. 25, 2020

(54) SYSTEM AND METHOD FOR ADAPTIVELY CONTROLLING A RECONFIGURABLE POWER CONVERTER

(71) Applicant: Raytheon Company, Waltham, MA (US)

(72) Inventor: Sriram Chandrasekaran, Lucas, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/971,958

(22) Filed: May 4, 2018

(65) Prior Publication Data

US 2019/0341840 A1 Nov. 7, 2019

(51) Int. Cl.
- *H02M 3/335* (2006.01)
- *H02M 3/337* (2006.01)
- *H02M 1/08* (2006.01)
- *H02M 1/00* (2006.01)

(52) U.S. Cl.
CPC ....... *H02M 1/083* (2013.01); *H02M 3/33576* (2013.01); *H02M 2001/0058* (2013.01)

(58) Field of Classification Search
CPC ............. H02M 3/33576; H02M 1/083; H02M 3/3376; H02M 3/33592; H02M 2007/4815

See application file for complete search history.

(56) References Cited

U.S. PATENT DOCUMENTS

| | | | | |
|---|---|---|---|---|
| 5,198,969 | A * | 3/1993 | Redl | H02M 3/337 363/132 |
| 8,605,460 | B2 * | 12/2013 | Mino | H02M 1/36 363/17 |
| 9,570,993 | B2 * | 2/2017 | Takahara | H02M 3/3376 |
| 9,667,153 | B2 * | 5/2017 | Hara | H02M 3/3353 |
| 2006/0220938 | A1 * | 10/2006 | Leung | H02M 3/33515 341/155 |
| 2008/0046204 | A1 * | 2/2008 | Jungreis | H02M 3/337 702/60 |
| 2009/0196072 | A1 * | 8/2009 | Ye | H02M 7/493 363/17 |
| 2010/0220500 | A1 | 9/2010 | Mino et al. | |
| 2015/0138841 | A1 * | 5/2015 | Pahlevaninezhad | H02J 3/383 363/17 |
| 2015/0349649 | A1 * | 12/2015 | Zane | H02M 3/33507 363/21.03 |

FOREIGN PATENT DOCUMENTS

EP 3229353 A1 11/2017

OTHER PUBLICATIONS

Redl et al., "Optimum ZVS Full-Bridge DC/DC Converter with PWM Phase-Shift Control: Analysis, Design Considerations, and Experimental Results," IEEE, 1994, 7 pages.

(Continued)

*Primary Examiner* — Adolf D Berhane
*Assistant Examiner* — Sisay G Tiku (57) ABSTRACT

A reconfigurable power converter is provided that includes a pulse-width modulation (PWM) controller. The PWM controller is configured to switch between a first modulation scheme and a second modulation scheme when a current-level property crosses a transition threshold.

20 Claims, 6 Drawing Sheets

(56) References Cited

OTHER PUBLICATIONS

Sabate et al., "Design Considerations for High-Voltage High-Power Full-Bridge Zero-Voltage-Switched PWM Converter," IEEE, 1990, 10 pages.

Ruan et al., "An Improved ZVS PWM Full-bridge Converter with Clamping Diodes," 2004 35th Annual IEEE Power Electronics Specialists Conference, IEEE, 2004, 6 pages.

International Search Report and Written Opinion of the International Searching Authority dated Apr. 1, 2019 in connection with International Patent Application No. PCT/US2019/013269, 14 pages.

Chen et al., "Switching Control Technique of Phase-Shift-Controlled Full-Bridge Converter to Improve Efficiency Under Light-Load and Standby Conditions Without Additional Auxiliary Components", IEEE Transactions on Power Electronics, vol. 25, No. 4, Apr. 1, 2010, p. 1001-1012.

Liu et al., "Light-Load Conversion Efficiency Improvement Strategy for Phase-Shift Full-Bridge Converters", 2017 IEEE 3rd International Future Energy Electronics Conference and ECCE Asia, Jun. 3, 2017, p. 488-493.

\* cited by examiner

SYSTEM AND METHOD FOR ADAPTIVELY CONTROLLING A RECONFIGURABLE POWER CONVERTER

TECHNICAL FIELD

This disclosure is directed, in general, to power converters and, more specifically, to a system and method for adaptively controlling a reconfigurable power converter.

BACKGROUND

A conventional power converter typically generates pulse-width modulated gating signals for the switches of the power converter in such a way as to improve efficiency either at one end of the operating region of the power converter or at the opposing end of the operating region. Thus, if a first traditional algorithm is implemented by the power converter, the pulse-width modulated gating signals are generated in a way that minimizes switching losses, but not conduction losses, in the power converter. Alternatively, if a second traditional algorithm is implemented by the power converter, the pulse-width modulated gating signals are generated in a way that minimizes conduction losses, but not switching losses, in the power converter.

SUMMARY

This disclosure provides a system and method for adaptively controlling a reconfigurable power converter.

In a first embodiment, a reconfigurable power converter is provided that includes a pulse-width modulation (PWM) controller. The PWM controller is configured to switch between a first modulation scheme and a second modulation scheme when a current-level property crosses a transition threshold.

In a second embodiment, a reconfigurable power converter is provided that includes an inductor leg, a transformer leg and a PWM controller. The inductor leg is configured to function as a linear leg based on a first pair of control signals and as a resonant leg based on a second pair of control signals. The transformer leg is configured to function as the linear leg based on the first pair of control signals and as the resonant leg based on the second pair of control signals. The PWM controller is configured to route the first pair of control signals to the inductor leg and the second pair of control signals to the transformer leg for a first modulation scheme. The PWM controller is also configured to route the first pair of control signals to the transformer leg and the second pair of control signals to the inductor leg for a second modulation scheme.

In a third embodiment, a method is provided for adaptively controlling a reconfigurable power converter that includes an inductor leg and a transformer leg. The method includes implementing a first modulation scheme by providing a plurality of control signals as a plurality of gating signals for the inductor leg and the transformer leg in accordance with the first modulation scheme. A current-level property is sensed. When the current-level property crosses a first transition threshold, the reconfigurable power converter transitions from the first modulation scheme to a second modulation scheme by providing the control signals as the gating signals for the inductor leg and the transformer leg in accordance with the second modulation scheme. When the current-level property crosses a second transition threshold, the reconfigurable power converter transitions back from the second modulation scheme to the first modulation scheme by providing the control signals as the gating signals for the inductor leg and the transformer leg in accordance with the first modulation scheme.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 5, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
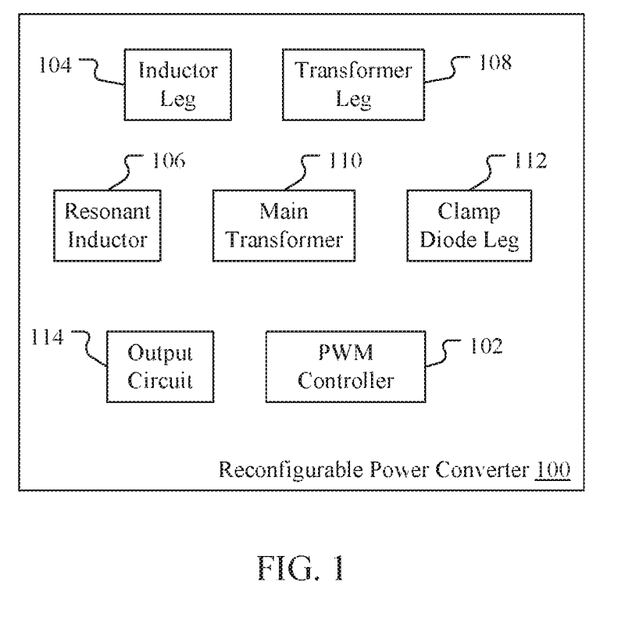
FIG. 1 illustrates a reconfigurable power converter in accordance with an embodiment of this disclosure.

FIG. 1 illustrates a reconfigurable power converter 100 in accordance with embodiments of this disclosure. The embodiment of the reconfigurable power converter 100 shown in FIG. 1 is for illustration only. Other embodiments of the reconfigurable power converter 100 could be used without departing from the scope of this disclosure.

For some embodiments, the reconfigurable power converter 100 includes a phase-shifted, full-bridge, zero-voltage switching, isolated DC/DC converter. However, it will be understood that the reconfigurable power converter 100 may include any other suitable type of power converter without departing from the scope of this disclosure. The reconfigurable power converter 100 is configured to convert an input voltage at a particular level to an output voltage at a different level.

For the embodiment illustrated in FIG. 1, the reconfigurable power converter 100 includes a pulse-width modulation (PWM) controller 102, an inductor leg 104, a resonant inductor 106, a transformer leg 108, a main transformer 110, a clamp diode leg 112, and an output circuit 114. As described in more detail below, the PWM controller 102 is configured to adaptively control the reconfigurable power converter 100 by adaptively switching between two different modulation schemes for the reconfigurable power converter 100.

The inductor leg 104 includes a switch matrix, which includes a plurality of switches. The inductor leg 104 is configured to generate current in the resonant inductor 106, which includes at least one inductor. The transformer leg 108 also includes a switch matrix, which includes a plurality of switches. The transformer leg 108 is configured to generate a transformer current for the main transformer 110. The main transformer 110 includes at least one transformer.

The clamp diode leg 112 includes a plurality of diodes and is configured to provide a path for the difference between the inductor and transformer currents depending on specified circumstances, as described below. The output circuit 114 includes an output voltage node, as well as any other suitable circuitry for generating an output voltage for the reconfigurable power converter 100.

The switches in the inductor leg 104 and the transformer leg 108 are configured to be turned on and off in such a way as to generate an output voltage at the output circuit 114 of the reconfigurable power converter 100. Every time a switch is turned on or off, the switch experiences a power loss, called a switching loss. When the power supply delivers a relatively low current, these switching losses dominate the overall power loss. However, when the power supply delivers a relatively high current, resistive losses, also known as conduction losses, dominate the overall power loss of the reconfigurable power converter 100. Thus, the reconfigurable power converter 100 may be configured to minimize switching losses when the current is low and then reconfigured to minimize conduction losses when the current is high, and vice versa.

In operation, according to some embodiments, the PWM controller 102 operates to adaptively interchange the functionality of the inductor leg 104 and the transformer leg 108 as linear and resonant legs. For a particular embodiment, the PWM controller 102 adaptively interchanges the functionality of the inductor leg 104 and the transformer leg 108 as linear and resonant legs based on the output current generated at the output circuit 114. For example, for a first modulation scheme implemented at lower output currents, the PWM controller 102 may provide PWM control signals as gating signals such that the inductor leg 104 operates as a resonant leg and the transformer leg 108 operates as a linear leg. For a second modulation scheme implemented at higher output currents, the PWM controller 102 may provide PWM control signals as gating signals such that the inductor leg 104 operates as the linear leg and the transformer leg 108 operates as the resonant leg. For other embodiments, the PWM controller 102 adaptively interchanges the functionality of the inductor leg 104 and the transformer leg 108 as linear and resonant legs based on another current-level property (i.e., a property related to the current level of the reconfigurable power converter 100 such that an increase in the current-level property corresponds to an increase in the current level of the reconfigurable power converter 100. For example, instead of the output current, the current-level property could be the power.

In this way, switching losses may be reduced at lower current levels, while conduction losses may be reduced at higher current levels. As a result, the efficiency of the reconfigurable power converter 100 may be optimized over the full load range of the output current. This is accomplished by changing how the PWM control signals are provided as gating signals by the PWM controller 102 to the switches of the inductor leg 104 and the transformer leg 108 and, thus, requires no additional hardware. In addition, there is no change to the modulation for the secondary-side switching devices.

Although FIG. 1 illustrates one example of a reconfigurable power converter 100, various changes may be made to the embodiment of FIG. 1. For example, various components of the reconfigurable power converter 100 could be combined, further subdivided, moved, or omitted and additional components could be added according to particular needs.

Figure 2:
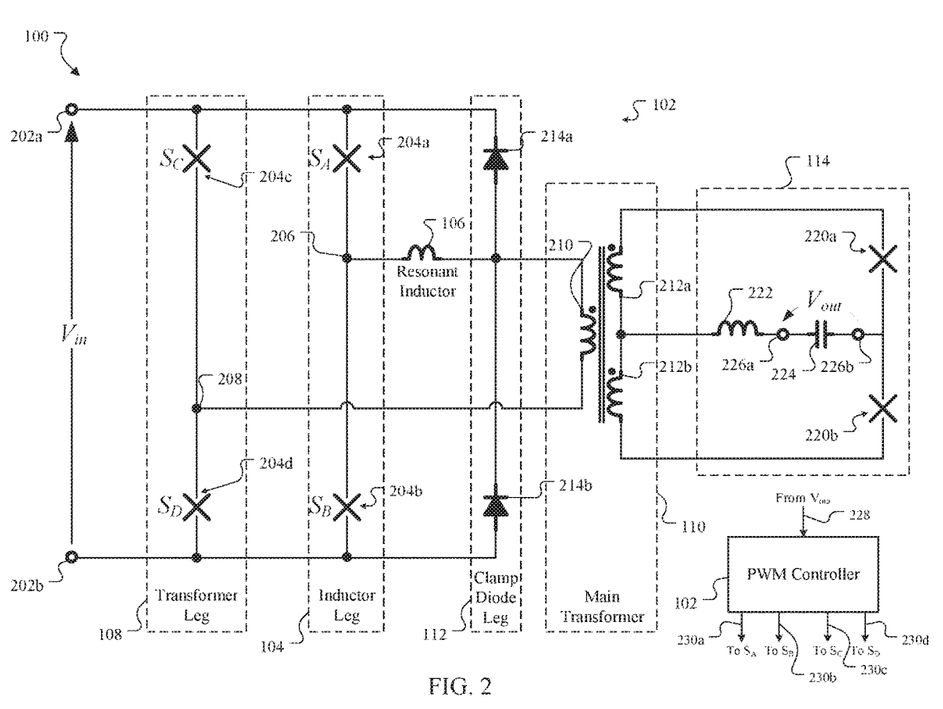
FIG. 2 illustrates a circuit diagram of the reconfigurable power converter of FIG. 1 in accordance with an embodiment of this disclosure.

FIG. 2 illustrates a circuit diagram of the reconfigurable power converter 100 in accordance with an embodiment of this disclosure. The embodiment of the reconfigurable power converter 100 shown in FIG. 2 is for illustration only. Other embodiments of the reconfigurable power converter 100 could be used without departing from the scope of this disclosure. The PWM controller for the reconfigurable power converter 100 may be implemented in a digital-signal processor, a field-programmable gate array, or other suitable device.

For the example illustrated in the embodiment of FIG. 2, the reconfigurable power converter 100 includes input voltage nodes $V_{in}$, 202a-b, which are coupled to the inductor leg 104, the transformer leg 108 and the clamp diode leg 112. The inductor leg 104 includes a first switch 204a ($S_A$), a second switch 204b ($S_B$), and a switch node 206. Similarly, the transformer leg 108 includes a first switch 204c ($S_C$), a second switch 204d ($S_D$), and a switch node 208. Each of the switches 204a-d may include a MOSFET, IGBT, or any other suitable switching device that includes three terminals. For some embodiments, the switches 204a-d may be gated with 50% duty cycle square waves. However, it will be understood that the switches 204a-d may be gated in any suitable manner without departing from the scope of this disclosure.

The main transformer 110 includes a primary winding 210, an upper secondary winding 212a and a lower secondary winding 212b. The clamp diode leg 112 includes a first diode 214a and a second diode 214b. The clamp diode leg 112 is coupled to the resonant inductor 106 and the transformer primary winding 210. The output circuit 114 may include a first switch 220a, a second switch 220b, an output inductor 222 and an output capacitor 224, in addition to output voltage nodes $V_{out}$ 226a-b. Each of the switches 220a-b may include a MOSFET, IGBT, or any other suitable switching device.

The inductor leg 104 is coupled to the resonant inductor 106 at the switch node 206 and to the clamp diode leg 112. The transformer leg 108 is coupled to the main transformer 110 at the switch node 208 and to the clamp diode leg 112. The inductor leg 104 and the transformer leg 108 are also coupled to each other. The PWM controller 102 is coupled to the output voltage nodes 226a-b of the output circuit 114 and to the switches 204a-d of the inductor leg 104 and the transformer leg 108. For this embodiment, the reconfigurable power converter 100 provides an isolated DC/DC converter with a full bridge on the primary side, while the secondary side may be implemented using multiple configurations.

The PWM controller 102 is configured to implement one of two different PWM modulation schemes for the reconfigurable power converter 100. Thus, the PWM controller 102 may be configured to generate control signals internally that are provided to the switches 204a-d as gating signals 230a-d in accordance with either a first PWM modulation scheme or a second PWM modulation scheme. For a particular embodiment, the PWM controller 102 is configured to sense an output current 228 (such as at the output voltage nodes 226a-b or other suitable location) and, based on the output current 228, to implement one of the two different PWM modulation schemes. For another particular embodiment, the PWM controller 102 is configured to sense a power level for the reconfigurable power converter 100 and, based on the power level, to implement one of the two different PWM modulation schemes.

In operation, according to some embodiments, the PWM controller 102 initially provides the control signals as the gating signals 230a-d in a particular order corresponding to the first modulation scheme. When the PWM controller 102 senses a current-level property (such as output current 228 or power level) above a first transition threshold, the PWM controller 102 reconfigures the reconfigurable power converter 100 by providing the control signals as the gating signals 230a-d in another particular order that corresponds to the second modulation scheme. Similarly, when the PWM controller 102 senses the current-level property has dropped below a second transition threshold, the PWM controller 102 again reconfigures the reconfigurable power converter 100 by providing the control signals as the gating signals 230a-d in the original, particular order that corresponds to the first modulation scheme. Thus, as the current level of the reconfigurable power converter 100 rises and falls, the PWM controller 102 adaptively controls the reconfigurable power converter 100 by switching its operation between the first and second modulation schemes. It will be understood that, for some embodiments, the PWM controller 102 may initially provide the control signals as the gating signals 230a-d in the particular order that corresponds to the second modulation scheme.

The values of the first and second transition thresholds may be determined based on any suitable criteria, such as input current or the like. For a specific example, for a system providing 50V at 20 A, the first transition threshold could be set at 5 A, while for a system providing 100V at 100 A, the first transition threshold could be set at 35 A. However, it will be understood that any suitable threshold may be chosen based on the particular needs of a particular application. In addition, the second transition threshold may be a different transition threshold from the first transition threshold in order to provide hysteresis in the transition boundaries. For a specific example, if the first transition threshold is set at 30 A, the second transition threshold could be set at 20 A. However, it will be understood that the difference between the two transition thresholds may be any suitable amount based on the particular application.

Based on the gating signals 230a-d provided by the PWM controller 102, the inductor leg 104 and the transformer leg 108 may each be designated as either a linear leg or a resonant leg in accordance with the functions performed by the phase legs of the full bridge. Switching commutations of the devices on the linear leg terminate the transfer of power from the primary to secondary side of the main transformer 110, while switching commutations of the devices on the resonant leg initiate the transfer of power from the primary to secondary side of the main transformer 110. Therefore, depending on which PWM modulation scheme the PWM controller 102 is implementing at a particular time, either the inductor leg 104 or the transformer leg 108 is coupled to the primary winding 210 of the main transformer 110, while the other leg 108 or 104 is coupled to the resonant inductor 106.

When the PWM controller 102 implements the first modulation scheme, the inductor leg 104 is coupled to the resonant inductor 106, while the transformer leg 108 is coupled to the transformer primary winding 210. This scheme increases the current in the clamp diodes 214a-b but achieves zero voltage switching for the transformer leg 108, which results in lower switching losses. When the PWM controller 102 implements the second modulation scheme, the transformer leg 108 is coupled to the resonant inductor 106, while the inductor leg 104 is coupled to the transformer primary winding 210. This scheme minimizes the current in the clamp diodes 214a-b and reduces conduction losses. Thus, by adaptively changing the modulation scheme through gating signals 230a-d provided by the PWM controller 102, the efficiency of the reconfigurable power converter 100 is optimized without any changes to the modulation scheme for the secondary-side switches 220a-b in the output circuit 114. In addition, the transitions between modulation schemes may be accomplished seamlessly while the reconfigurable power converter 100 is operating without impacting the terminal behavior.

Although FIG. 2 illustrates one example of a reconfigurable power converter 100, various changes may be made to the embodiment of FIG. 2. For example, various components of the reconfigurable power converter 100 could be combined, further subdivided, moved, or omitted and additional components could be added according to particular needs. For a particular example, the output current 228 could be sensed at a location other than the output voltage nodes 226a-b. For another example, instead of the output current 228, a power level could be sensed by the PWM controller 102.

Figure 3A:
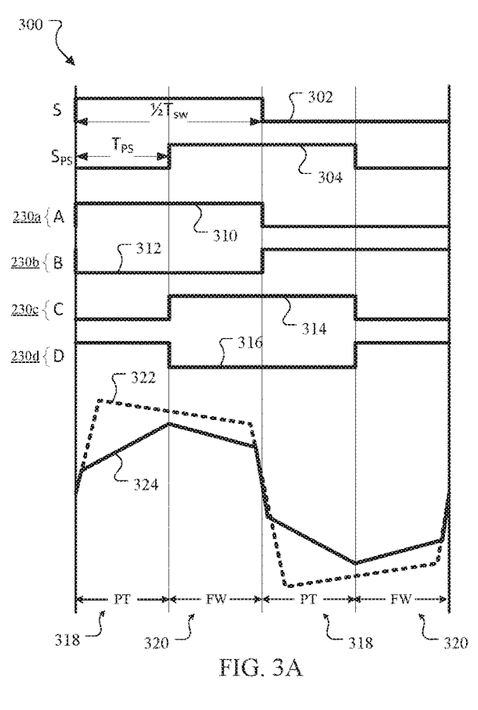
FIG. 3A illustrates a first modulation scheme for the reconfigurable power converter of FIG. 1 in accordance with an embodiment of this disclosure.

FIG. 3A illustrates a first modulation scheme 300 for the reconfigurable power converter 100 in accordance with an embodiment of this disclosure. For this modulation scheme 300, the inductor leg 104 functions as the resonant leg and the transformer leg 108 functions as the linear leg.

As illustrated in FIG. 3A, the signals for the first modulation scheme 300 include a master clock signal S 302, a phase-shifted clock signal $S_{PS}$ 304, a first pair of control signals 310 and 312, and a second pair of control signals 314 and 316. The master clock signal 302 is high for one-half of a switching cycle, $T_{SW}$, and low for the remaining half of the switching cycle. Similarly, the phase-shifted clock signal 304 is high for one-half of a switching cycle and low for the remaining half of the switching cycle. However, the phase-shifted clock signal 304 is phase-shifted with respect to the master clock signal 302 by a specified time period, $T_{PS}$, which corresponds to approximately one-fourth of a switching cycle in the illustrated embodiment. The shift in time between the master clock signal 302 and the phase-shifted clock signal 304 is the duty cycle that controls the output voltage at the output voltage nodes 226a-b of the reconfigurable power converter 100. For example, if the input voltage is 100V and the phase shift is 20%, the output voltage will be 20V. Thus, this phase shift may be selected based on a particular application.

The first pair of control signals 310 and 312 tracks the master clock signal 302. The control signal 310 positively tracks the master clock signal 302, while the control signal 312 complementarily tracks the master clock signal 302. That is, when the master clock signal 302 is high, the control signal 310 is high and the control signal 312 is low. Similarly, when the master clock signal 302 is low, the control signal 310 is low and the control signal 312 is high.

The second pair of control signals 314 and 316 tracks the phase-shifted clock signal 304. The control signal 314 positively tracks the phase-shifted clock signal 304, while the control signal 316 complementarily tracks the phase-shifted clock signal 304. That is, when the phase-shifted clock signal 304 is high, the control signal 314 is high and the control signal 316 is low. Similarly, when the phase-shifted clock signal 304 is low, the control signal 314 is low and the control signal 316 is high.

When the PWM controller 102 is implementing the first modulation scheme 300 as illustrated in FIG. 3A, the PWM controller 102 routes the first pair of control signals 310 and 312 to the inductor leg 104 of the reconfigurable power converter 100, with the control signal 310 providing a gating signal 230a for the first switch 204a and the control signal 312 providing a gating signal 230b for the second switch 204b. Similarly, the PWM controller 102 routes the second pair of control signals 314 and 316 to the transformer leg 108 of the reconfigurable power converter 100, with the control signal 314 providing a gating signal 230c for the first switch 204c and the control signal 316 providing a gating signal 230d for the second switch 204d.

These signals 302, 304, 310, 312, 314 and 316, are shown divided into four sections of alternating power transfer (PT) and freewheel (FW) phases 318 and 320. Thus, a first section shows a power transfer phase 318 that includes a high master clock signal 302, a low phase-shifted clock signal 304, high control signals 310 and 316, and low control signals 312 and 314. This is followed by a second section that shows a freewheel phase 320 that includes a high master clock signal 302, a high phase-shifted clock signal 304, high control signals 310 and 314, and low control signals 312 and 316. This is followed by a third section that shows a power transfer phase 318 that includes a low master clock signal 302, a high phase-shifted clock signal 304, high control signals 312 and 314, and low control signals 310 and 316. This is followed by a fourth section that shows a freewheel phase 320 that includes a low master clock signal 302, a low phase-shifted clock signal 304, high control signals 312 and 316, and low control signals 310 and 314. At this point, the cycle repeats with the first section and continues on in the same manner.

The power transfer phase 318 is a phase in which power is transferred from the input voltage nodes 202a-b to the output voltage nodes 226a-b through the main transformer such that the output current 228 is directly related to the input current. The freewheel phase 320 is a phase in which energy stored in the output inductor 222 circulates to the output voltage nodes 226a-b but no electrical connection exists between the input and the output. In addition, the linear leg is a leg that switches to accomplish a transition from the power transfer phase 318 to the freewheel phase 320, which is a linear transition, and the resonant leg is a leg that switches to accomplish a transition from the freewheel phase 320 to the power transfer phase 318, which is a resonant transition. Thus, as shown in FIG. 3A (and in FIG. 3B), the edge of the phase-shifted clock 304 corresponds to a linear transition, and the edge of the master clock signal 302 corresponds to a resonant transition.

FIG. 3A also illustrates a typical example of an inductor current 322 (i.e., a current through the resonant inductor 106), indicated as a dashed line, and a primary current 324 (i.e., a current through the primary winding 210 of the main transformer 110), indicated as a solid line. Any current resulting from a difference between the inductor current 322 and the primary current 324 flows through one of the diodes 214a-b in the clamp diode leg 112 of the reconfigurable power converter 100. For example, when more current is flowing through the resonant inductor 106 than through the transformer primary winding 210, the overflow current is directed through the first diode 214a. Similarly, when less current is flowing through the resonant inductor 106 than through the transformer primary winding 210, additional current is directed through the second diode 214b. Thus, with the first modulation scheme 300, this difference (the diode current) results in higher conduction losses (as compared to the second modulation scheme 350, described below in connection with FIG. 3B) but lower switching losses. As a result, this first modulation scheme 300 is useful when the output current 228 is relatively low because the switching losses dominate at low current, and the first modulation scheme 300 minimizes switching losses.

Figure 3B:
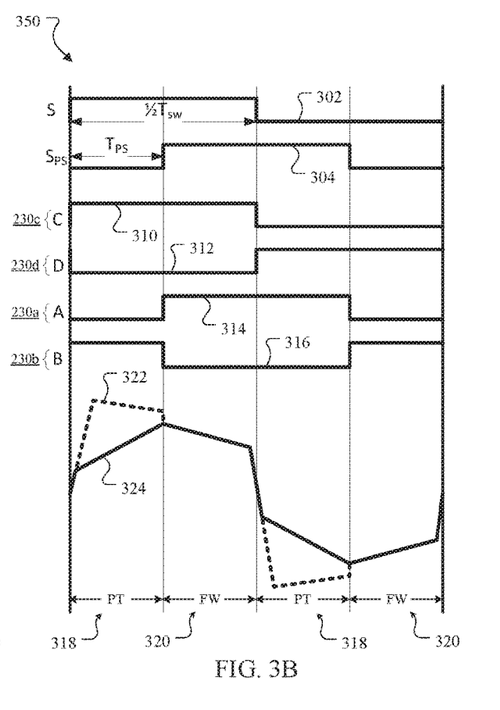
FIG. 3B illustrates a second modulation scheme for the reconfigurable power converter of FIG. 1 in accordance with an embodiment of this disclosure.

FIG. 3B illustrates a second modulation scheme 350 for the reconfigurable power converter 100 in accordance with an embodiment of this disclosure. For this modulation scheme 350, the inductor leg 104 functions as the linear leg and the transformer leg 108 functions as the resonant leg.

As illustrated in FIG. 3B, the signals for the second modulation scheme 350 include the master clock signal S 302, the phase-shifted clock signal $S_{PS}$ 304, the first pair of control signals 310 and 312, and the second pair of control signals 314 and 316. As with the first modulation scheme 300 shown in FIG. 3A, the first pair of control signals 310 and 312 tracks the master clock signal 302, and the second pair of control signals 314 and 316 tracks the phase-shifted clock signal 304. Thus, there is no change in any of these signals 302, 304, 310, 312, 314 or 316.

However, when the PWM controller 102 is implementing the second modulation scheme 350 as illustrated in FIG. 3B, the PWM controller 102 routes the first pair of control signals 310 and 312 to the transformer leg 108 (instead of the inductor leg 104) of the reconfigurable power converter 100, with the control signal 310 providing a gating signal 230c for the first switch 204c and the control signal 312 providing a gating signal 230d for the second switch 204d. Similarly, the PWM controller 102 routes the second pair of control signals 314 and 316 to the inductor leg 104 (instead of the transformer leg 108) of the reconfigurable power converter 100, with the control signal 314 providing a gating signal 230a for the first switch 204a and the control signal 316 providing a gating signal 230b for the second switch 204b.

As in FIG. 3A, the signals 302, 304, 310, 312, 314 and 316 shown in FIG. 3B are divided into four sections of alternating power transfer (PT) and freewheel (FW) phases 318 and 320. Because the signals 302, 304, 310, 312, 314 and 316 remain the same, the power transfer and freewheel phases 318 and 320 have the same relationships between the signals as in the first modulation scheme 300. However, because the PWM controller 102 is implementing the second modulation scheme 350, the relationship between the inductor current 322 and the primary current 324 is different. As shown in FIG. 3B, the difference between these currents 322 and 324, and thus the amount of diode current through the clamp diode leg 112, is greatly reduced. Thus, when the PWM controller 102 implements this modulation scheme 350, the switching losses are higher (as compared to the first modulation scheme 300, described above in connection with FIG. 3A) but the conduction losses are reduced. As a result, this second modulation scheme 350 is useful when the output current 228 is relatively high because the conduction losses dominate at high current, and the second modulation scheme 350 minimizes conduction losses by minimizing the current through the diodes 214a-b.

Figure 4A:
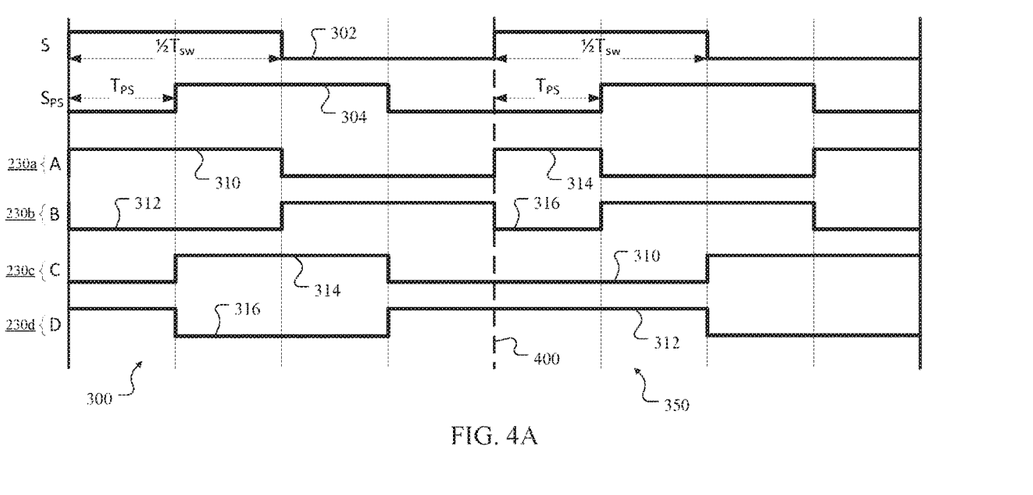
FIG. 4A illustrates a transition from the first modulation scheme to the second modulation scheme in the reconfigurable power converter of FIG. 1 in accordance with an embodiment of this disclosure.

FIG. 4A illustrates a transition from the first modulation scheme 300 to the second modulation scheme 350 in the reconfigurable power converter 100 in accordance with an embodiment of this disclosure. For this embodiment, the master clock signal 302, the phase-shifted clock signal 304, the first pair of control signals 310 and 312, and the second pair of control signals 314 and 316 each correspond to the signals 302, 304, 310, 312, 314 and 316 illustrated in FIGS. 3A and 3B. FIG. 4A simply illustrates the transition from the first modulation scheme 300 of FIG. 3A to the second modulation scheme 350 of FIG. 3B.

As a result, for the first modulation scheme 300, the PWM controller 102 routes the first pair of control signals 310 and 312 as gating signals 230a and 230b to the switches 204a and 204b, respectively, of the inductor leg 104 and routes the second pair of control signals 314 and 316 as gating signals 230c and 230d to the switches 204c and 204d, respectively, of the transformer leg 108.

However, when the PWM controller 102 senses the current-level property has surpassed a predetermined first transition threshold, which happens to occur at a transition time 400 in this example (indicated as a vertical dashed line), the PWM controller 102 transitions to the second modulation scheme 350. The PWM controller 102 then begins providing the first pair of control signals 310 and 312 as gating signals 230d and 230d to the switches 204c and 204d, respectively, of the transformer leg 108 and begins providing the second pair of control signals 314 and 316 as gating signals 230a and 230b to the switches 204a and 204b, respectively, of the inductor leg 104.

This transition from the first modulation scheme 300 to the second modulation scheme 350 that occurs at the transition time 400 is made seamlessly during operation of the reconfigurable power converter 100 without any impact to the flux balance in the main transformer 110 or other inductive components. In addition, dead times between transitions of the control signals 310, 312, 314 and 316 may also be easily transitioned from one modulation scheme to the other in order to maximize efficiency.

Figure 4B:
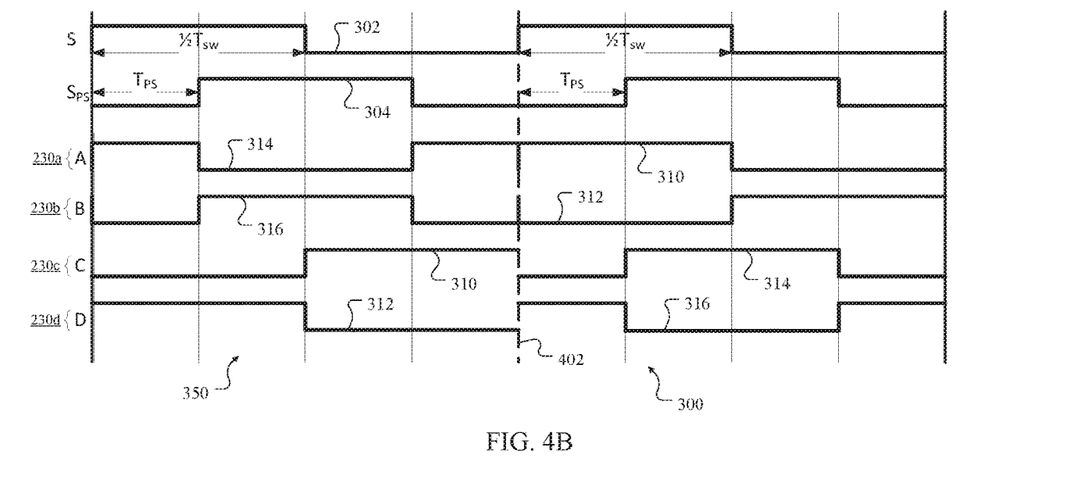
FIG. 4B illustrates a transition from the second modulation scheme to the first modulation scheme in the reconfigurable power converter of FIG. 1 in accordance with an embodiment of this disclosure.

FIG. 4B illustrates a transition from the second modulation scheme 350 to the first modulation scheme 300 in the reconfigurable power converter 100 in accordance with an embodiment of this disclosure. For this embodiment, the master clock signal 302, the phase-shifted clock signal 304, the first pair of control signals 310 and 312, and the second pair of control signals 314 and 316 each correspond to the signals 302, 304, 310, 312, 314 and 316 illustrated in FIGS. 3A and 3B. FIG. 4B simply illustrates the transition from the second modulation scheme 350 of FIG. 3B to the first modulation scheme 300 of FIG. 3A.

As a result, for the second modulation scheme 350, the PWM controller 102 routes the first pair of control signals 310 and 312 as gating signals 230c and 230d to the switches 204c and 204d, respectively, of the transformer leg 108 and routes the second pair of control signals 314 and 316 as gating signals 230a and 230b to the switches 204a and 204b, respectively, of the inductor leg 104.

However, when the PWM controller 102 senses the current-level property has dropped below a predetermined second transition threshold, which happens to occur at a transition time 402 in this example (indicated as a vertical dashed line), the PWM controller 102 transitions to the first modulation scheme 300. The PWM controller 102 then begins providing the first pair of control signals 310 and 312 as gating signals 230a and 230b to the switches 204a and 204b, respectively, of the inductor leg 104 and begins providing the second pair of control signals 314 and 316 as gating signals 230c and 230d to the switches 204c and 204d, respectively, of the transformer leg 108. It will be understood that the second transition threshold may be different from the first transition threshold so as to provide hysteresis in the transition boundaries.

Figure 5:
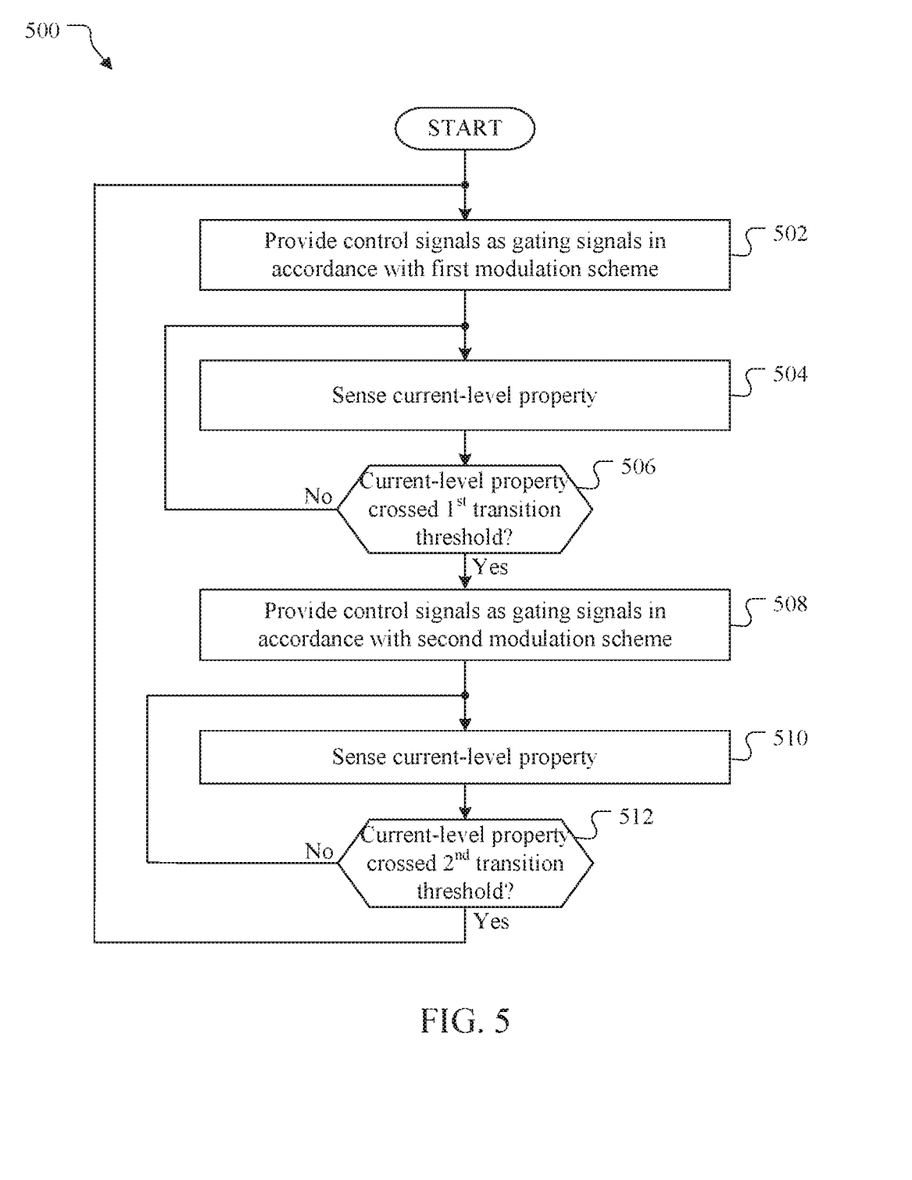
FIG. 5 illustrates a method for adaptively controlling the reconfigurable power converter of FIG. 1 in accordance with an embodiment of this disclosure.

FIG. 5 illustrates a method 500 for adaptively controlling the reconfigurable power converter 100 in accordance with an embodiment of this disclosure. The method 500 shown in FIG. 5 is for illustration only. A reconfigurable power converter 100 may be adaptively controlled in any other suitable manner without departing from the scope of this disclosure.

Initially, control signals 310, 312, 314 and 316 are provided as gating signals 230a-d in accordance with a first modulation scheme (step 502). For example, for a particular embodiment, the PWM controller 102 routes the control signals 310 and 312 to the inductor leg 104 and the control signals 314 and 316 to the transformer leg 108. For some embodiments, based on the first modulation scheme 300, the PWM controller 102 provides the control signal 310 as a first gating signal 230a for a first switch 204a in the inductor leg 104, the control signal 312 as a second gating signal 230b for a second switch 204b in the inductor leg 104, the control signal 314 as a third gating signal 230c for a first switch 204c in the transformer leg 108, and the control signal 316 as a fourth gating signal 230d for a second switch 204d in the transformer leg 108. Thus, these control signals 310, 312, 314 and 316 correspond to gating signals 230a, 230b, 230c and 230d, respectively, resulting in the reconfigurable power converter 100 operating under the first modulation scheme 300.

A current-level property for the reconfigurable power converter 100 is sensed (step 504). For example, for a particular embodiment, the PWM controller 102 senses the output current 228 (at the output voltage nodes 226a-b of the output circuit 114 of the reconfigurable power converter 100 or other suitable location). If the current-level property has not crossed a first transition threshold (step 506), the current-level property continues to be sensed (step 504) until the current-level property crosses the first transition threshold (step 506). For example, for a particular embodiment, the output current 228 may continue to be sensed until the output current 228 surpasses the first transition threshold.

When the current-level property crosses than the first transition threshold (step 506), the control signals 310, 312, 314 and 316 are provided as gating signals 230a-d in accordance with a second modulation scheme (step 508). For example, for a particular embodiment, when the output current 228 surpasses the first transition threshold, the PWM controller 102 routes the control signals 314 and 316 to the inductor leg 104 and the control signals 310 and 312 to the transformer leg 108. For some embodiments, based on the second modulation scheme 350, the PWM controller 102 provides the control signal 314 as the first gating signal 230a for the first switch 204a in the inductor leg 104, the control signal 316 as the second gating signal 230b for the second switch 204b in the inductor leg 104, the control signal 310 as the third gating signal 230c for the first switch 204c in the transformer leg 108, and the control signal 312 as the fourth gating signal 230d for the second switch 204d in the transformer leg 108. Thus, these control signals 310, 312, 314 and 316 correspond to gating signals 230c, 230d, 230a and 230b, respectively, resulting in the reconfigurable power converter 100 operating under the second modulation scheme 350.

The current-level property for the reconfigurable power converter 100 is sensed (step 510). For example, for a particular embodiment, the PWM controller 102 senses the output current 228 (at the output voltage nodes 226a-b of the output circuit 114 of the reconfigurable power converter 100 or other suitable location). If the current-level property has not crossed a second transition threshold (step 512), the current-level property continues to be sensed (step 510) until the current-level property crosses the second transition threshold (step 512). For example, for a particular embodiment, the output current 228 may continue to be sensed until the output current 228 drops below the second transition threshold.

When the current-level property crosses the second transition threshold (step 512), the control signals 310, 312, 314 and 316 are again provided as gating signals 230a-d in accordance with the first modulation scheme (step 502). For example, for a particular embodiment, when the output current 228 drops below the second transition threshold, the PWM controller 102 again routes the control signals 310 and 312 to the inductor leg 104 and the control signals 314 and 316 to the transformer leg 108. The second transition threshold may be different from the first transition threshold in order to provide hysteresis in the transition boundaries.

In this way, a PWM control technique is provided that allows the reconfigurable power converter 100 to be reconfigured between two different PWM modulation schemes 300 and 350 in order to maximize the efficiency of the reconfigurable power converter 100 as compared to a power converter that implements a single PWM modulation scheme.

Although FIG. 5 illustrates one example of a method 500 for adaptively controlling the reconfigurable power converter 100, various changes may be made to the embodiment shown in FIG. 5. For example, while shown as a series of steps, various steps in FIG. 5 could overlap, occur in parallel, occur in a different order, or occur multiple times. As a specific example, the PWM controller 102 may continuously sense the current-level property instead of only sensing the current-level property at the discrete times associated with steps 504 and 510. As another example, for some embodiments, the reconfigurable power converter 100 may initially operate under the second modulation scheme 350. For these embodiments, the first modulation scheme of step 502 would correspond to the second modulation scheme 350 of FIG. 3B, and the current-level property would be sensed (step 504) until the current-level property dropped below the first transition threshold (step 506). Similarly, the second modulation scheme of step 508 would correspond to the first modulation scheme 300 of FIG. 3A, and the current-level property would be sensed (step 510) until the current-level property surpassed the second transition threshold (step 512).

Modifications, additions, or omissions may be made to the apparatuses and methods described herein without departing from the scope of the disclosure. For example, the components of the apparatuses may be integrated or separated. The methods may include more, fewer, or other steps. Additionally, as described above, steps may be performed in any suitable order.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above descriptions of various embodiments does not define or constrain this disclosure. Other changes, substitutions, and alterations are also possible without departing from the spirit and scope of this disclosure, as defined by the following claims.

What is claimed is:

1. A reconfigurable power converter, comprising:
a pulse-width modulation (PWM) controller configured to switch between a first modulation scheme and a second modulation scheme when a current-level property crosses a transition threshold;
wherein, to implement the first modulation scheme, the PWM controller is configured to provide first control signals to an inductor leg of the power converter and provide second control signals to a transformer leg of the power converter; and
wherein, to implement the second modulation scheme, the PWM controller is configured to provide the first control signals to the transformer leg of the power converter and provide the second control signals to the inductor leg of the power converter.

2. The reconfigurable power converter of claim 1, wherein the PWM controller is further configured to initially implement the first modulation scheme, sense the current-level property, and implement the second modulation scheme when the current-level property crosses the transition threshold.

3. The reconfigurable power converter of claim 2, wherein the transition threshold comprises a first transition threshold, and wherein the PWM controller is configured (i) to implement the second modulation scheme when the current-level property surpasses the first transition threshold and (ii) to re-implement the first modulation scheme when the current-level property drops below a second transition threshold.

4. The reconfigurable power converter of claim 2, wherein the transition threshold comprises a first transition threshold, and wherein the PWM controller is configured (i) to implement the second modulation scheme when the current-level property drops below the first transition threshold and (ii) to re-implement the first modulation scheme when the current-level property surpasses a second transition threshold.

5. The reconfigurable power converter of claim 1, wherein:
the inductor leg is configured to function as a linear leg based on the first control signals and as a resonant leg based on the second control signals; and
the transformer leg is configured to function as the linear leg based on the first control signals and as the resonant leg based on the second control signals.

6. The reconfigurable power converter of claim 1, wherein the inductor leg comprises a first switch and a second switch, wherein the transformer leg comprises a third switch and a fourth switch, and wherein the first switch and the second switch of the inductor leg and the third switch and the fourth switch of the transformer leg are gated with 50% duty cycle square waves.

7. A reconfigurable power converter, comprising:
an inductor leg configured to function as a linear leg based on a first pair of control signals and as a resonant leg based on a second pair of control signals;

a transformer leg configured to function as the linear leg based on the first pair of control signals and as the resonant leg based on the second pair of control signals; and a pulse-width modulation (PWM) controller configured to route the first pair of control signals to the inductor leg and the second pair of control signals to the transformer leg for a first modulation scheme and to route the first pair of control signals to the transformer leg and the second pair of control signals to the inductor leg for a second modulation scheme.

8. The reconfigurable power converter of claim 7, wherein the first pair of control signals comprises a first gating signal and a second gating signal, and wherein the second pair of control signals comprises a third gating signal and a fourth gating signal.

9. The reconfigurable power converter of claim 8, wherein the inductor leg comprises a first switch and a second switch, and wherein the transformer leg comprises a third switch and a fourth switch.

10. The reconfigurable power converter of claim 9, wherein for the first modulation scheme, the PWM controller is configured to route the first pair of control signals to the inductor leg and the second pair of control signals to the transformer leg by providing the first gating signal to the first switch of the inductor leg, providing the second gating signal to the second switch of the inductor leg, providing the third gating signal to the third switch of the transformer leg, and providing the fourth gating signal to the fourth switch of the transformer leg.

11. The reconfigurable power converter of claim 9, wherein for the second modulation scheme, the PWM controller is configured to route the first pair of control signals to the transformer leg and the second pair of control signals to the inductor leg by providing the first gating signal to the third switch of the transformer leg, providing the second gating signal to the fourth switch of the transformer leg, providing the third gating signal to the first switch of the inductor leg, and providing the fourth gating signal to the second switch of the inductor leg.

12. The reconfigurable power converter of claim 7, wherein the PWM controller is further configured to sense a current-level property and to implement the first modulation scheme or the second modulation scheme based on the current-level property.

13. The reconfigurable power converter of claim 12, wherein the PWM controller is further configured to transition from the first modulation scheme to the second modulation scheme when the current-level property surpasses a transition threshold.

14. The reconfigurable power converter of claim 13, wherein the transition threshold comprises a first transition threshold, and wherein the PWM controller is further configured to transition from the second modulation scheme to the first modulation scheme when the current-level property drops below a second transition threshold.

15. A method for adaptively controlling a reconfigurable power converter comprising an inductor leg and a transformer leg, the method comprising:
implementing a first modulation scheme by providing a plurality of control signals as a plurality of gating signals for the inductor leg and the transformer leg in accordance with the first modulation scheme;
sensing a current-level property;
when the current-level property crosses a first transition threshold, transitioning from the first modulation scheme to a second modulation scheme by reversing the control signals provided as the gating signals for the inductor leg and the transformer leg in accordance with the second modulation scheme; and
when the current-level property crosses a second transition threshold, transitioning from the second modulation scheme back to the first modulation scheme by again reversing the control signals provided as the gating signals for the inductor leg and the transformer leg in accordance with the first modulation scheme.

16. The method of claim 15, wherein the inductor leg comprises a first switch and a second switch, wherein the transformer leg comprises a third switch and a fourth switch, wherein the control signals comprise a first control signal, a second control signal, a third control signal and a fourth control signal, and wherein the gating signals comprise a first gating signal for the first switch of the inductor leg, a second gating signal for the second switch of the inductor leg, a third gating signal for the third switch of the transformer leg, and a fourth gating signal for the fourth switch of the transformer leg.

17. The method of claim 16, wherein providing the control signals as the gating signals for the inductor leg and the transformer leg in accordance with the first modulation scheme comprises providing the first control signal as the first gating signal, providing the second control signal as the second gating signal, providing the third control signal as the third gating signal, and providing the fourth control signal as the fourth gating signal.

18. The method of claim 17, wherein reversing the control signals provided as the gating signals for the inductor leg and the transformer leg in accordance with the second modulation scheme comprises providing the first control signal as the third gating signal, providing the second control signal as the fourth gating signal, providing the third control signal as the first gating signal, and providing the fourth control signal as the second gating signal.

19. The method of claim 16, further comprising gating, with the gating signals, the first switch and the second switch of the inductor leg and the third switch and the fourth switch of the transformer leg with 50% duty cycle square waves.

20. The method of claim 15, wherein the current-level property comprises one of an output current and a power.

* * * * *